United States Patent [19]
Sheldon

[11] 3,747,042
[45] July 17, 1973

[54] PRESSURE TRANSDUCER

[75] Inventor: James B. Sheldon, Orange County, Calif.

[73] Assignee: Gulton Industries, Inc., Metuchen, N.J.

[22] Filed: Aug. 24, 1971

[21] Appl. No.: 174,408

[52] U.S. Cl. ................................ 338/42, 73/407 R
[51] Int. Cl. ............................................ H01c 13/00
[58] Field of Search .............................. 338/42, 36; 73/407 R, 407 PR

[56] References Cited
UNITED STATES PATENTS

| | | |
|---|---|---|
| 2,627,183 | 2/1953 | Greenwood .................. 73/407 R X |
| 2,627,750 | 2/1953 | Titus .............................. 73/407 R |
| 3,534,612 | 10/1970 | Buckland ..................... 73/407 R X |
| 3,162,795 | 12/1964 | Chernick ...................... 73/407 R X |
| 3,596,520 | 8/1971 | Sanford ......................... 73/407 R |

Primary Examiner—C. L. Albritton
Attorney—Robert R. Thornton

[57] ABSTRACT

A pressure transducer using diaphragm capsules. In a first general embodiment, operable to avoid failure due to extreme overpressure, a pair of nestable diaphragm capsules, differing one from the other in surface area and rigidity, are interconnected by a passageway, and the diaphragms and passageway are filled with a substantially incompressible fluid. In a second general embodiment, operable to cancel out inertial effects, pairs of diaphragm capsules are utilized. Each capsule forms an interface between the high and low pressures and the diaphragms are positioned in opposition to one another, so as to move in opposite directions in response to a given change in pressure differential. A third general embodiment combines the first and second embodiments.

14 Claims, 11 Drawing Figures

PRESSURE TRANSDUCER

BACKGROUND OF THE INVENTION

1. Field of the Invention

This invention relates to pressure transducers which utilize movement of a diaphragm constituting a pressure differential interface to vary an output signal to provide measurement of pressure differential.

2. Description of the Prior Art

A pair of diaphragms connected together to form a capsule, have been used heretofore in order to generate an output signal which is a function of a pressure differential across the interface formed by the diaphragms. As an example of such prior art devices, one diaphragm is connected to the magentic core of a linear variable differential transformer, and moves in accordance with the pressure differential across the diaphragm to vary the magnetic coupling of the transformer primary winding and one of the transformer secondary windings relative to the magnetic coupling between transformer primary winding and the other secondary winding of the transformer. The diaphragms have conventionally been of the bellows or aneroid type, in which, upon maximum pressure being applied, a volume remains within the capsule. Such devices have been susceptible to failure by reason of overpressure, particularly overpressure from the side of a diaphragm to which the lower of the two pressures forming the pressure differential is normally applied. Furthermore, such devices have exhibited the the of providing incorrect readings due to inertial effects, such as acceleration or vibration, which cause an erroneous movement of the magnetic core with respect to the transformer.

SUMMARY

According to one general embodiment of the invention, operable to avoid failure due to overpressure, a pair of nestable diaphragm capsules are utilized. The nestable diaphragm capsules are interconnected by a passageway, and the capsules and passageway are filled with a substantially incompressible fluid. Preferably, the nestable diaphragm capsules differ one from the other, and the capsule to which the lower pressure is normally applied is of greater surface area and of less rigidity than the capsule to which the higher pressure is normally applied. Means for measuring diaphragm movement are connected to one of the high pressure side diaphragms, which moves in accordance with a change in pressure differential between the high pressure and low pressure. Either diaphragm capsule may collapse completely upon itself, so as to exclude the fluid contained there within the fluid then being contained in the passageway and the other diaphragm capsule.

A second general embodiment of the invention utilizes a pair of diaphragm capsules. Each diaphragm capsule forms a pressure interface between the same two pressure sources. The diaphragms are positioned so as to move in opposite directions in response to a change in pressure differential across the interfaces, and move in the same direction in response to inertial effects. Each diaphragm has an associated output circuit, whose output is controlled by diaphragm movement. By utilizing, as one of the pressure sources, either vacuum, ambient pressure, or a variable pressure, the transducer output may be a function of absolute pressure, gauge pressure, or differential pressure, respectively.

In a third general embodiment of the invention, nestable diaphragm capsules are combined in pairs with each of two output signal generating means, so as to form a transducer which combines the first and second general embodiments. Such an embodiment provides protection against overpressure in either pressure supply and erroneous pressure readings due to inertial effects.

In a change in output signal second and third embodiments, means are provided to interconnect the output circuits so that, upon movement of the diaphragms in opposite directions in response to a change in pressure differential across the interfaces, a change in output signal from the transducer will occur, and so that, when the diaphragms move in the same direction in response to inertial effects, the changes in output signals cancel out one another, so that no change in transducer output magnitude occurs.

BRIEF DESCRIPTION OF THE DRAWING

Referring now to the accompanying drawing.

DESCRIPTION OF THE PREFERRED EMBODIMENTS

Figure 1:
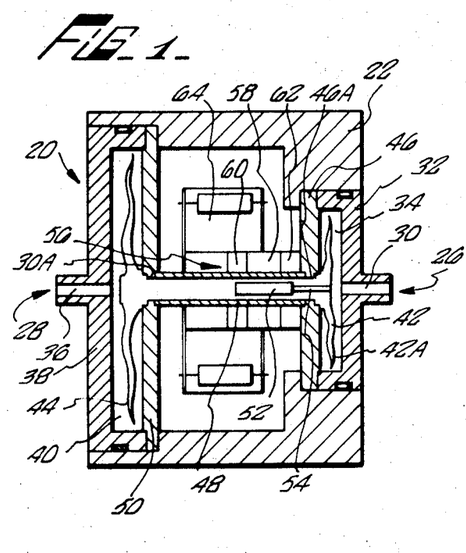
FIG. 1 is a view, in section, of a pressure transducer according to one embodiment of the invention.

Referring now to FIG. 1, there is shown in section a pressure transducer 20. The transducer 20 has a hollow housing 22, which may be any suitable material of sufficient rigidity for the particular environmental conditions to be encountered. Connected to the housing 22 are a high pressure inlet port 26 and a low pressure inlet port 28. As will be seen in FIG. 1, the high pressure inlet port 26 consists of an aperture 30 formed in a port body 32, the aperture 30 opening into a high pressure chamber 34. The low pressure inlet port 28 is similarly constructed, having an inlet aperture 36 formed in a port body 38 so as to open into a low pressure chamber 40.

Dspssed within the high pressure chamber 34 is a high pressure sensor 42. The high pressure sensor 42 is formed by welding together, around their periphery, a pair of diaphragms, so as to form a cavity between the diaphragms within which the diaphragms may contract or from which the diaphragms may expand, depending upon whether the pressure differential across the diaphragms is in a positive or negative sense. The low pressure chamber 40 has a somewhat similar low pressure sensor 44 disposed therewithin. The low pressure sensor 44 is formed in the same manner as the high pressure sensor 42. In the particular embodiment shown in FIG. 1, both the high pressure sensor and low pressure sensor are of the nestable type, that is, the diaphragms may collapse one upon the other so as to substantially eliminate the space between the diaphragms. Such a construction is to be contrasted to the conventional type of aneroid, in which the diaphragms are mirror images of one another, so that they cannot collapse one upon the other to substantially elemenate all of the space therebetween.

The high pressure port 26 includes a base plate 46 to which the port body 32 is attached. The high pressure sensor 42 is attached to the base plate 46 and sealed about a central aperture 46A formed therein. A passage forming tube 48 of low permeability material, preferably metal for high pressure embodiments, extends between a passageway forming aperture 46A formed in the base plate 46 and a passageway forming aperture 50A formed in a base plate 50, and about which the low pressure sensor 44 is attached and sealed, so as to form a passageway between the high pressure chamber 34 and the low pressure chamber 40. This passageway is sealed, with respect to the high pressure chamber, by the high pressure sensor with respect to the low pressure chamber, by the low pressure sensor, and with respect to atmosphere, by the base plates 46, 50 and tube 48. The tube 48, if metal, may be welded to metallic base plates 46, 50 for sealing and rigidity purposes. The interior of the space formed by passageway forming tube 48, the high pressure sensor 42, and low pressure sensor 44 is filled with a substantially incompressable fluid, so that a constant pressure exists throughout the interior of the passageway forming tube 48 and the sensors 42 and 44.

For purposes of illustration of one type of input signal generating means, a magnetic core 52 is disposed within the passageway forming tube 48 and is attached by connector arm 54 to one of the diaphragms forming the high pressure sensor. Disposed about the passageway forming tube 48 is a linear variable differential transformer 56. Linear variable differential transformers are well-known in the art, and consist generally of a primary winding, a pair of secondary windings and a moveable magnetic core. The primary winding may be positioned intermediate of the secondary windings, or the secondary windings may be wound on the primary windings so as to be adjacent one another and enclose the primary winding.

The linear variable differential transformer 56 is shown as having a primary winding 58, a first secondary winding 60, and a second secondary winding 62. Also mounted within the housing 22, and associated with the linear variable differential transformer 56, is an electronics module 64. The electronics module 64 provides excitation and output circuitry for the linear variable differential transformer and is conventional in design.

As will be apparent from FIG. 1, the linear variable differential transformer 56 utilizes the magnetic core 52 in order to change the coupling between its primary winding and its first secondary winding relative to the coupling between it primary winding and its second secondary winding. The relative change is accomplished by physically moving the magnetic core 52 longitudinally with respect to the linear variable differential transformer 58. This movement of the magnetic core 52 is accomplished by reason of movement of the diaphragm of the high pressure sensor 42, to which the magnetic core 52 is connected by the connector arm 54. Thus, assuming initially that a first pressure, which is a relatively high pressure, exists in the high pressure chamber 34 and a second pressure, which is a relatively low pressure, exists in the low pressure chamber 40, any change in either of these pressures produces change in the pressure differential which exists between the high pressure chamber 34 and the low pressure chamber 40. By reason of the pressure transfer characteristic of the incompressable fluid 24, the diaphragm of the high pressure sensor 42 to which the magnetic core 56 is attached then moves either inwardly or outwardly, with respect to the linear variable differential transformer 56. This movement is transmitted to the magnetic core 52, and so changes the coupling between the primary winding and the first secondary winding relative to the coupling between the primary winding and the second secondary winding. The primary winding is energized by an appropriate a-c signal. Such an energizing signal may be, for example, a 10 khz sine wave generated in the electronics module 64. Appropriate output circuitry, such as is shown in FIG. 2, is utilized to produce an output signal indicative of such a change, which is then applied to the electronics module 64 for further processing to present a visual or other indication of either actual pressure or change in pressure, depending upon the particular utilization being made of the device of FIG. 1.

Figure 2:
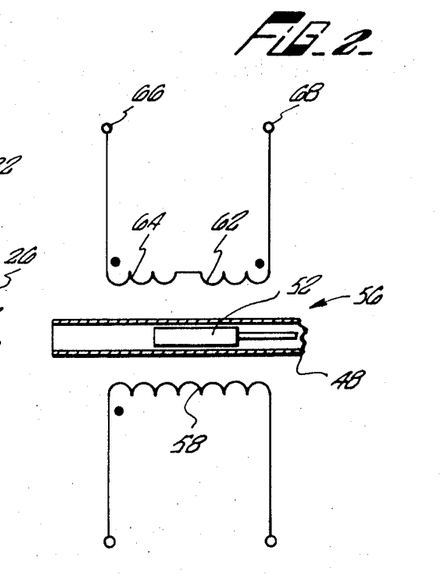
FIG. 2 is a schematic diagram of the output circuitry for the linear variable differential transformer of the embodiment of FIG. 1.

Referring now to FIG. 2, there is shown in schematic form the input and output circuitry of the linear variable differential transformer 56. Conventional dot notation is utilized to indicate the relative phasing of the windings in the linear variable differential transformer. Thus, assuming initially that the magnetic core 52 is positioned such that the coupling between the primary and first secondary winding is the same as the coupling between the primary and second secondary winding, and both secondary windings hav the same number of turns, the excitation of the primary winding by application of an appropriate signal will result in equal signals being induced in the first secondary winding 60 and second secondary winding 62. These windings are connected in opposition, so that the induced signals will result in a zero a-c output across output terminals 66, 68. If the magnetic core 52 is moved along the passageway forming tube 48, the coupling between the primary winding and the first secondary winding relative to the coupling between the primary winding and the second secondary winding will be changed. Then one secondary winding will be more closely coupled to the primary winding than the other, resulting in an increased output signal in one secondary winding and a decreased output signal in the other secondary winding. The change in coupling, producing the change in output signals in the two secondary windings, results in an a-c output appearing across the output terminals 66, 68. The circuitry shown in FIG. 2 is well-known in the art, and is included for purposes of explanation of the device shown in FIG. 1 and explanation of the additional embodiments to be described hereinafter.

As will be apparent from the foregoing description, the embodiment of FIGS. 1 and 2 is particularly adapted to pressure differential measurements in which pressure in one pressure port is to be compared to pressure in an adjacent port. The embodiment of FIGS. 1 and 2 depends upon the use of two nesting diaphragm means, each consisting of a pair of diaphragms connected together so as to form a hollow cavity, into or out of which the incompressible fluid moves in accordance with the pressure differential. The nesting diaphragms have convolutions which will coincide so that, when overpressure is applied, complete nesting of the two diaphragm elements results. The coinciding convolutions are shown in the diaphragms of FIG. 1.

The magnetic core is directly attached to one of the diaphragms, to which the high pressure is normally applied. The diaphragms to which the low pressure is normally applied serve as an isolator, so as to protect the interior of the device from contaminants or the like. The isolator or low pressure diaphragm preferably has a large pressure sensitivity as compared to the high pressure sensor. Such increased pressure sensitivity is readily accomplished by increasing the surface area and decreasing the rigidity of the isolator diaphragms with respect to the high pressure diaphragms.

The structure heretofore described reduces the effects of expansion and contraction of fluid due to temperature change. Furthermore, since the interior passageway communicating between the diaphragms is filled with the incompressible fluid, and contains the magnetic core, the fluid acts as a damping agent to reduce erroneous core movement which may result from inertial effects, such as vibration and transient acceleration. Since both the high pressure diaphragm capsule and the low pressure isolator or diaphragm capsule are the nesting type, extremely large overpressures, applied either to the high pressure diaphragm or to the low pressure diaphragm, can be accepted by the transducer of FIG. 1 without failure, as a result of a use of the incompressible fluid and the nesting diaphragm design.

In FIG. 1, the nestable diaphragm sensors 42, 44 are shown as each consisting of a pair of diaphragms. However, the sensors may be nestable and each consist of only a single diaphragm, by forming the complementary convolutions on the base plates 46, 50 and attaching the single diaphragms directly to the base plates at the diaphragm peripheries. In such an embodiment, the passageway seal would be formed as a peripheral diaphragm seal, rather than sealing immediately about the passageway forming apertures 46A, 50A, the structure of FIG. 1. The term diaphragm means, as used hereinafter, is therefore to be understood to include both sensor capsules formed by connecting together a pair of diaphragms and pressure sensors formed by peripherally attaching a single diaphragm to a base or mounting plate. The latter configuration, for a given size, normally will result in a decreased sensitivity to pressure change since only one diaphragm moves, rather than two, as is the case with the capsule configuration.

Figure 3:
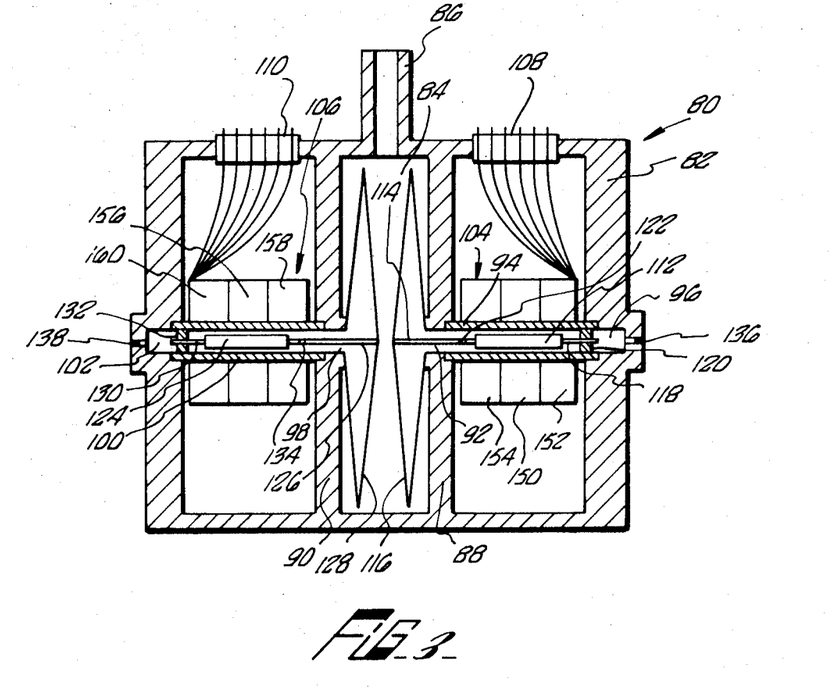
FIG. 3 is a schematic view, in section, of another embodiment of pressure transducer according to the present invention, adapted to measure absolute pressure.

Referring now to FIG. 3, there is shown, in schematic form in section, an alternate embodiment of the present invention particularly adapted for the measurement of absolute pressure. In FIG. 3, a pressure transducer 80 has a housing 82 formed of any appropriate material. Within the housing 82, a first pressure inlet chamber 84 has an inlet port 86. The first pressure inlet chamber 84 is formed within the housing 80 by a pair of housing walls 88, 90. The housing wall 88 has a passageway forming aperture 92 centrally formed therein which opens into the interior of a first passageway forming tube 94. The first passageway forming tube 94 terminates at a second pressure inlet chamber 96 formed in the housing 82. The housing wall 90 has a passageway forming aperture 98 centrally formed therein which opens into the interior of a second passageway forming tube 100. The second passageway forming tube 100 terminates in another second pressure inlet chamber 102.

Within the housing 82, mounted about the first passageway forming tube 94, is a first linear variable differential transformer 104. A second linear variable differential transformer 106 is mounted on the second passageway forming tube 100. The first and second linear variable differential transformers 104, 106 each have a primary winding and a pair of secondary windings, indicated schematically in FIG. 3 as terminating in an array of terminals 108, 110, respectively. The first linear variable differential transformer 104 includes a magnetic core 112 mounted within the first passageway forming tube 94. The magnetic core 112 is connected by means of a connector arm 114 to a first pressure sensor 116 and is supported by means of a connector arm extension 118 which passes through a bearing 120. The connector arm and connector arm extension may be hollow, and include a pressure communication aperture 122 formed in the connector arm 114 so as to communicate the pressure which exists in the second pressure inlet chamber 96 into the passageway forming tube 94.

The first pressure sensor 116 is sealed to the housing wall 88 about the aperture 92. The first pressure sensor 116 is of the double diaphragm type previously referred to with respect to FIG. 1, and may be either nestable or not, as desired for the particular application. Therefore, the first pressure sensor 116 is shown schematically in FIG. 3, as is the case in the remaining Figures. By means of the hollow connector arm extension and connector arm, on which the core 112 is mounted, and the aperture 122 formed in the connector arm, the pressure which exists in the second pressure inlet chamber 96 is communicated to the interior of the first pressure sensor 116. Thus, the diaphragms of the first pressure sensor 116 forms a pressure interface between the pressure existing in the first pressure inlet chamber 84 and the pressure existing in the second pressure inlet chamber 96.

The second linear variable differential transformer 106 similarly has a magnetic core 124 supported within the passageway forming tube 100 by a connector arm 126 which is attached to a second pressure sensor 128 and a connector arm extension 130 which extends through a bearing 132. The second pressure sensor 128 is identical to the first pressure sensor 116. Communication between the other second pressure inlet chamber 102 and the interior of the second pressure sensor 128 is established through the hollow conductor arm 126 and connector arm extension 130, on which the magnetic core 124 is mounted, and a pressure communication aperture 134 formed in the connector arm. If desired, communication between the second pressure inlet chambers and the interior of the first and second pressure sensors can alternatively be established by a passageway extending through the bearings 120, 132. As is seen in the particular embodiment of FIG. 3, the second pressure chambers are sealed by seals 136, 138 from ambient pressure. Prior to sealing, the second pressure chambers are evacuated, so that zero absolute pressure exists in the interiors of the pressure sensors 116, 128.

Figure 4:
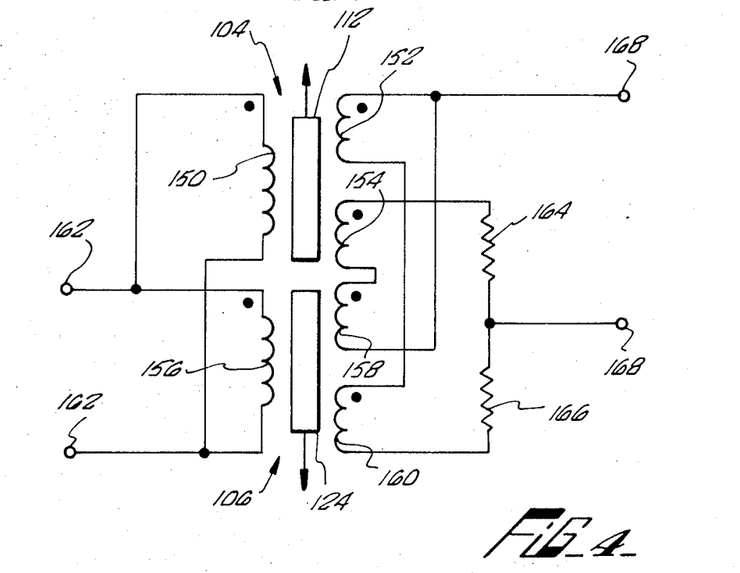
FIG. 4 is a schematic diagram of the output circuitry of the pressure transducer of FIG. 3.

Referring now to FIG. 4, there is shown, in schematic form, a drawing illustrating the interconnection between the first linear variable differential transformer 104 and the second linear variable differential transformer 106. The first linear variable differential transformer 104 has a primary winding 150, a first secondary winding 152 and a second secondary winding 154. The second linear variable differential transformer 106 has a primary winding 156, a first secondary winding 158 and a second secondary winding 160. Conventional dot notation is utilized in FIG. 4 to illustrate the relative phasings of the transformer windings as interconnected. An input signal is applied across a pair of input terminals 162. As will be seen, the primary windings 150, 156 are connected in parallel across the input terminals 162. Thus, the signal applied to the terminals 162 is applied across both primary windings 150, 156. The first secondary winding 152 of the first linear variable differential transformer 104 is connected in series with the second secondary winding 160 of the second linear variable differential transformer 106. Similarly, the second secondary winding 154 of the first linear variable differential transformer 104 is connected in series with the first secondary winding 158 of the second linear variable differential transformer 106. A pair of output bridge resistors 164, 166 are connected to each other and to the second secondary windings 154, 160 so as to form a bridge circuit whose active legs are formed by windings 160, 152 and windings 158, 154, the output of which is taken across a pair of output terminals 168.

Arrows are utilized in FIG. 4 to indicate the relative direction of movement of the magnetic cores 112, 124 in response to a pressure differential change in the device. Thus, upon a pressure differential change such that the pressure in the device shown in FIG. 3 increases across the interfaces formed by the diaphragms 128, 116, the magnetic cores 112, 124 will move in the direction shown by the arrows. Coupling between the first linear variable differential transformer primary winding 150 and the first linear variable differential transformer first secondary winding 152 will increase relative to the coupling between the winding 150 and the second secondary winding 154. Similarly, with respect to secondary windings of the second linear variable differential transformer 106, the coupling between the primary winding 156 and the first secondary winding 158 will decrease relative to the coupling between the primary winding 156 and the second secondary winding 160.

Assuming initially that the magnetic cores 112, 124 are positioned so that the a-c output signal across the output terminals 168 is zero in response to the application to the input terminals 162 of an input signal, movement of the magnetic cores 112, 124 in the directions shown will then result in an output signal of finite magnitude existing across the output terminals 168. Since the pressure transducer of FIG. 3 utilizes zero pressure in the second pressure chambers, so that the pressure differential across the interfaces is zero only when the pressure to be measured is zero, the magnitude of the output signal across the output terminals 168 is therefore a function of the absolute pressure applied to the inlet port.

Figure 5:
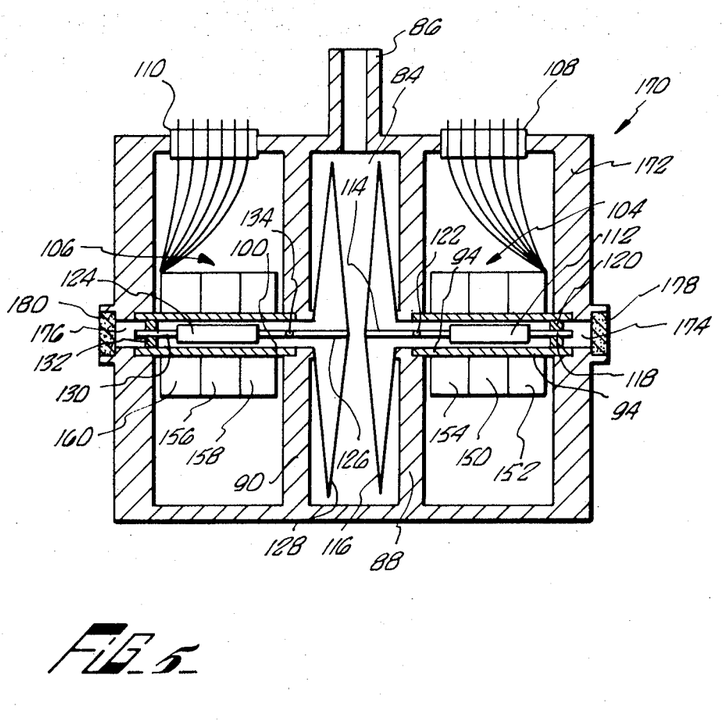
FIG. 5 is a schematic view, in section, of a modification of the embodiment of FIG. 3 for measuring gauge pressure.

FIG. 5 is a view, in schematic form in section, of another alternative embodiment of the present invention. The embodiment of FIG. 5 is particularly adapted to measure gauge pressure. Components in FIG. 5 corresponding to the components of FIG. 3 are identically numbered. A pressure transducer 170 has a housing 172 within which the linear variable differential transformers 104, 106 are disposed. The embodiment of FIG. 5 differs from the embodiment of FIG. 3 in that, in FIG. 5, a pair of second pressure inlet chambers 174, 176 communicate with ambient pressure, rather than being sealed, as was illustrated in FIG. 3. Thus, the second pressure chambers have seals 178, 180 which may be, for example, porous material such as utilized in filters. Of course, if the ambient atmosphere is not such as to cause possible degradation in performance by reason of containing dust, moisture or the like, the seals 178, 180 can be eliminated entirely, and the second pressure inlet chambers 174, 176 open directly into the ambient atmosphere.

In operation, the pressure transducer 170 of FIG. 5 functions in a manner identical to that of the pressure transducer 80 of FIG. 3. However, since the second pressure inlet chambers 174, 176 are at ambient pressure, the pressure differential which produces the output signal is the pressure differential between ambient and the pressure applied to the inlet port 86. Thus, the outut signal of the pressure transducer is a function of gauge pressure.

Figure 6:
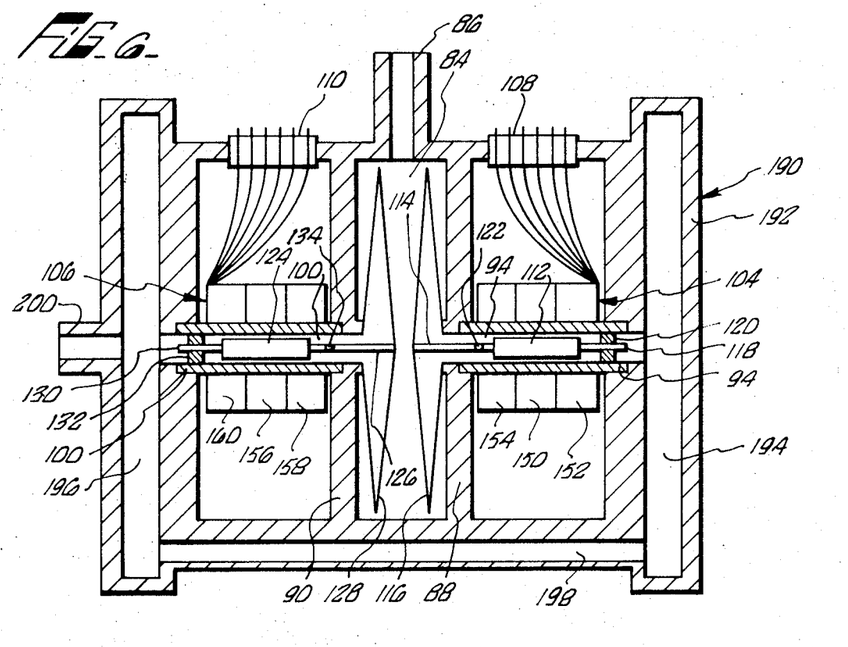
FIG. 6 is a schematic view, in section, of another modification of the embodiment of FIG. 3 for measuring differential pressure.

Referring now to FIG. 6, there is shown in section, a schematic view of another alternate embodiment of the present invention, adapted to measure pressure differential between two variable pressure sources. In FIG. 6, a pressure transducer 190 has a housing 192 generally similar to the housing 172 of the pressure transducer 170. However, the second pressure inlet chambers 174, 176 of the pressure trasnducer 170 have been replaced by a pair of second pressure inlet chambers 194, 196 which are connected together by a pressure transfer passage 198. The second pressure is applied to the second pressure inlet chambers 194, 196 by means of a second pressure inlet port 200, formed in the housing 192 adjacent the second pressure inlet chamber 196. Normally, the second pressure will be a lower pressure than the first pressure, applied to the inlet port 86, so that the diaphragms 128, 116 will collapse rather than being blown out.

Figure 7:
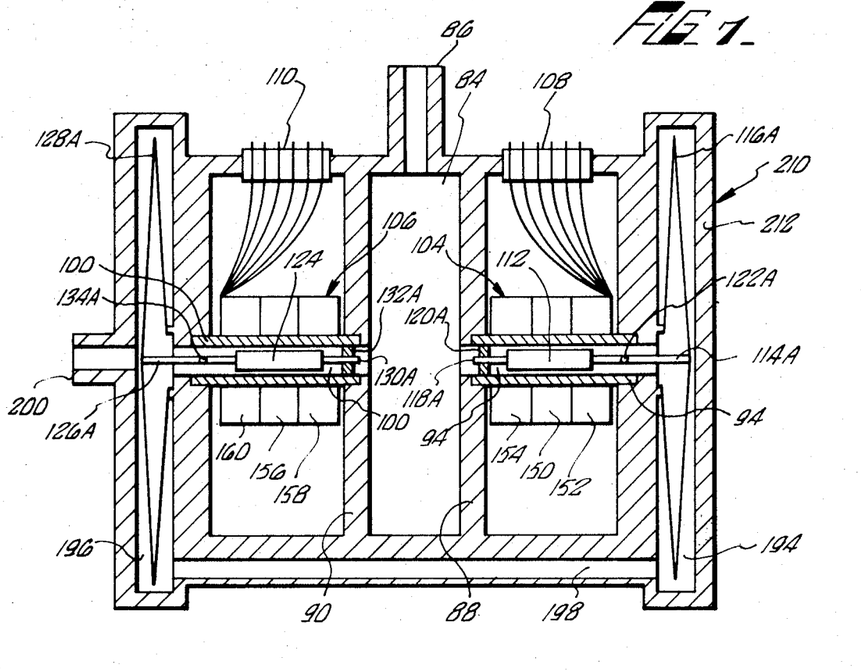
FIG. 7 is a schematic view, in section, of an alternate configuration of the device of FIG. 6.

FIG. 7 is a schematic view, in section, of another embodiment of pressure transducer according to the present invention. In FIG. 7, a pressure transducer 210 has a housing 212 containing the two linear variable differential transformers 104, 106 and associated components. In FIG. 7, the inlet port 86 opens into a first pressure inlet chamber 84. However, the first pressure inlet chamber 84 does not contain diaphragms. Rather, a pair of diaphragm-type sensors 116A, 128A are contained in the second pressure inlet chambers 194, 196, respectively. The magnetic cores 112, 124 are attached to the diaphragms by connector arms 114A, 126A, respectively, and are mounted within the first passageway forming tube 94 and second passageway forming tube 100 by bearings 120A, 132A, through which connector arm extensions 118A, 124A extend. In operation, the device of FIG. 7 functions in a manner similar to that described with respect to the device of FIG. 6, except that normally the first pressure would be less than the second pressure, in order to avoid blowing out the diaphragms. As will be apparent from a comparison of FIGS. 6 and 7, with respect to the structure shown therein, both devices perform the same type of measurement. Thus, as is illustrated by these devices, the diaphragms are mounted in a generally opposing relationship.

In operation, in FIG. 7, application of a pressure to the second pressure inlet port 200 causes this pressure to be communicated to the second pressure inlet chamber 196 and through the second pressure transfer passage 198, to the other second pressure inlet chamber 194. The first pressure, applied to the first pressure inlet port 86, is communicated from the first pressure chamber 84 through the connector arm extensions 118A, 124A, the connector arms 114A, 126A, out the pressure communication apertures 122A, 134A, and into the interior of the diaphragms 116A, 128A. The diaphragms 116A, 128A will expand or collapse in an amount which is a function of the pressure differential which exists across the interfaces they form. The magnetic cores are thereby positioned. A change in the pressure differential across the interfaces is reflected by a change in core position resulting from additional expansion or contraction of the diaphragms. A change in core positions causes a change in output signal magnitudes.

Figure 8:
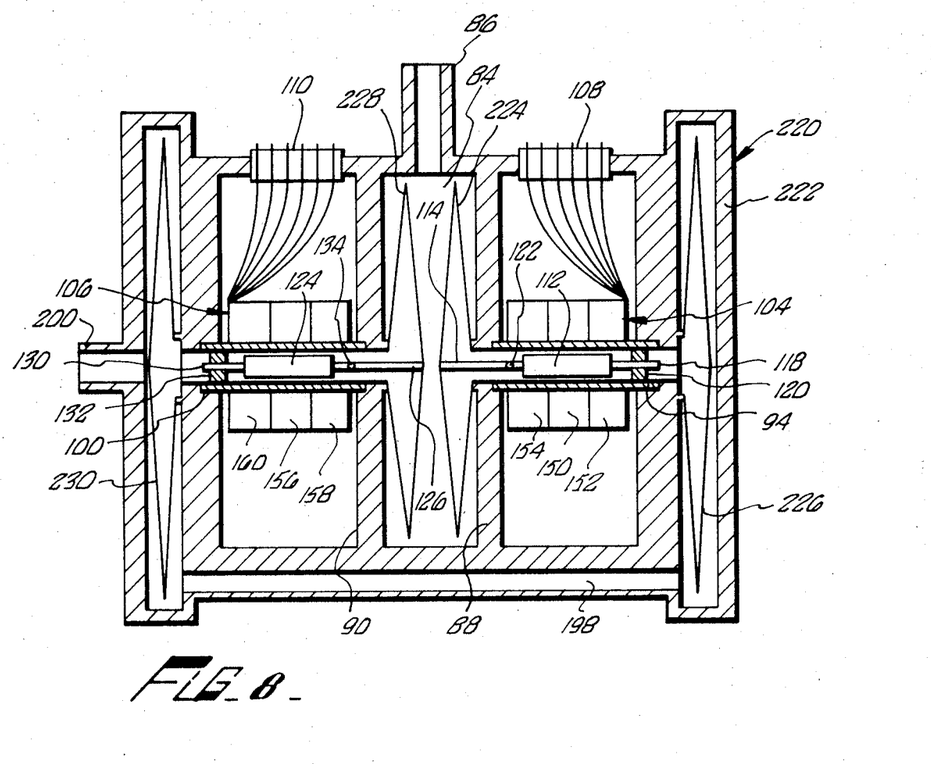
FIG. 8 is a schematic view, in section, of a pressure transducer which utilizes a combination of the embodiments of FIGS. 1 and 6.

Referring now to FIG. 8, there is shown, in section, a schematic view of another embodiment of pressure transducer according to the present invention. In FIG. 8, the pressure transducer 220 has a housing 222 generally similar in configuration to the housing 192 of FIG. 6 and the housing 212 of FIG. 7. Disposed within the housing, in addition to the first and second linear variable differential transformers 104, 106, are a first high pressure diaphragm-type sensor 224, a first low pressure diaphragm-type sensor 226, a second high pressure diaphragm-type sensor 228, and a second low pressure diaphragm-type sensor 230. The first high pressure sensor 224, the first low pressure sensor 226, and linear variable differential transformer 104 may correspond to the high pressure sensor 42, low pressure sensor 44, and linear variable differential transformer 56 of FIG. 1. Similarly, the second high pressure sensor 228, second low pressure sensor 230 and linear variable differential transformer 104 may also correspond to these components of FIG. 1.

Alternatively, the space within the high and low pressure diaphragms and connecting passageway need not be filled with the incompressible fluid of FIG. 1. Also, if desired, the diaphragms need not be of the nesting type. However, such an embodiment does not embody the advantages of the transducer of FIG. 1, as to accuracy and over pressure which may be withstood. As will be apparent from FIG. 8, the pressure transducer 220, by utilizing a pair of diaphragms with respect to each of the linear variable differential transformers, provides the isolation which was accomplished with respect to the device of FIG. 1, while providing the accurate measurement of the devices of FIGS. 3, 5, 6 and 7, by reason of including the two linear variable differential transformers. Thus, the device of FIG. 8 has the advantage with respect to device of FIG. 1 in being relatively insensitive to inertial effects, such as vibration and acceleration. Such effects, when applied to the device of FIG. 1, result in erroneous reading due to movement of the magnetic core.

With respect to devices shown in FIGS. 3, 5, 6, 7 and 8, each of the figures illustrates the device schematically as having the passageway forming tubes, within which the magnetic cores are disposed, axially aligned with one another, about the same axis. However, it will be understood that such axial alignment is not necessary, and that the passageways can be displaced one from another. However, it is essential that the movement of the magnetic cores be in opposite directions in response to a given change in pressure differential across the interfaces in order to cancel out the inertial effects. Therefore, the diaphragms are mounted in opposing relationship in each of these embodiments, so that, for a given pressure differential existing at each interface, the magnetic cores will move, in response to a change in pressure differential, in opposite directions, by having the passageways aligned with respect to a given axis, from which they may be laterally displaced, so that core movement is parallel to the given axis.

As was mentioned heretofore, the embodiment of FIG. 8 may be utilized with the liquid-filled diaphragms of the embodiment of FIG. 1, or with diaphragms of conventional type which are not nestable. However, it is preferable to use nestable diaphragms and the incompressible fluid filling. Otherwise, the true pressure differential between the low pressure port and the high pressure port may not be sensed, since a compressible fluid between the low pressure and high pressure diaphragms would not truly transmit the low pressure magnitude to the interface provided by the high pressure diaphragm. Since the low pressure or isolator diaphragm is a weak interface, the utilization of the incompressible fluid within the diaphragms transmits the low pressure accurately to the high pressure diaphragm interface, which constitutes the interface across which the pressure differential is measured. It is for this reason that the magnetic core is connected to the high pressure diaphragm, rather than to the low pressure diaphragm.

Figure 9:
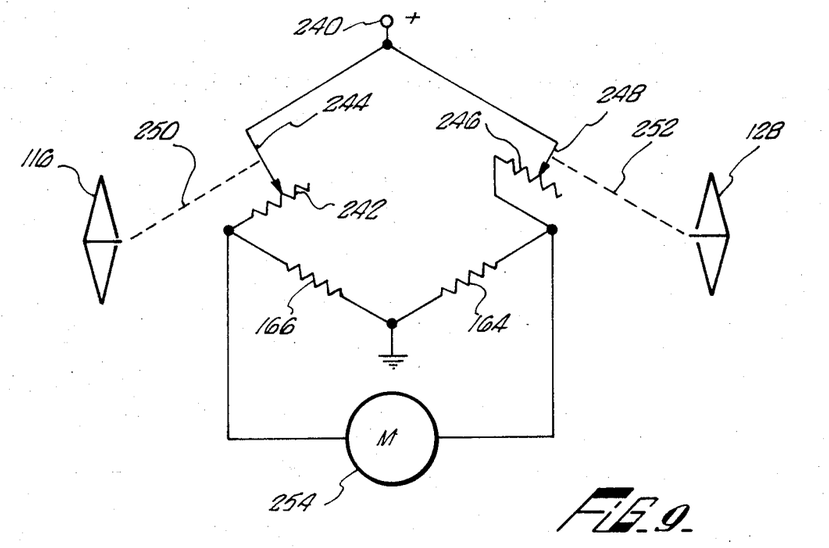
FIG. 9 is a schematic diagram of an alternate embodiment of output circuitry for the devices of FIGS. 3, 5, 6, 7 and 8.

FIG. 9 is a schematic diagram of an alternate embodiment of output circuit. In the circuitry of FIG. 9, the linear variable differential transformers and a-c bridge circuit of FIG. 4 have been replaced by variable resistors in a d-c bridge circuit. In FIG. 9, a positive potential is applied to an input terminal 240. The positive potential at the input terminal 240 is conducted to a first variable resistor 242 and applied to an arm 244 thereof. The positive potential is also conducted to a second variable resistor 246 and applied to an arm 248 thereof. Matching bridge resistors 164, 166 are connected to the variable resistors 242, 246 so as to complete the bridge circuit. A connector arm 250 extends from the diaphragm capsule 116 to the arm 244. A connector arm 252 extends from the diaphragm capsule 128 to the arm 248. The connector arms 250, 252 are shown schematically, and may consist either of a direct connection, or a connection between the diaphragm and the arm which includes circuitry or structure for amplifying diaphragm movement. The variable resistors 242, 246 are linear, and are matched.

The output circuit of FIG. 9 operates as a conventional wheatstone bridge circuit, in which the variable resistors 242, 246 are the active legs which insert resistance values into the bridge circuit which are functions of the pressure differential across the interfaces of the diaphragm capsules 116, 128. The variable resistors 242, 246 are connected in the bridge circuit so that, upon a change in pressure differential across the interfaces of the diaphragm capsules 116, 128, causing the diaphragms to move in opposite directions, the resistance which one of the potentiometers inserts into the bridge circuit increases, while the resistance the other potentiometer inserts into the bridge circuit decreases. The circuit unbalance is measured by a meter 254.

When absolute pressure or gauge is to be measured, the circuit of FIG. 9 is calibrated initially to read the particular actual pressure existing across the interfaces, either as absolute gauge or differential pressure, depending upon the particular application. Thus, the bridge is initially unbalanced, unless the pressure differential across the interfaces is zero. Thereafter, any change in the pressure differential across the interfaces will be reflected as a change in the value of the meter reading, thereby indicating the new pressure differential across the interfaces. While the use of variable resistors has been shown in FIG. 9, such are utilized for illustrative purposes only, and represent that class of devices, such capacitive change sensing devices and strain gauges, which may be used in appropriate bridge circuitry, in order to provide an output which is a function of pressure differential across the interfaces and which changes in accordance with a change in pressure differential across the interfaces.

The use of opposed sensing systems, such as are shown in FIGS. 3 through 9, provide for sensing system movement in opposite directions in response to pressure differential change, and in the same direction in response to inertial effects. In order to provide for optimum reduction of inertial effects, the ratio of the stiffness of the sensing capsule to the total moving mass associated with the capsule should be the same for the opposing capsules. For example, in FIG. 8, the ratio of the stiffness of the diaphragm capsule 224 to the connector 114, magnetic core 112, connector extension 118, and an appropriate percentage of the mass of the diaphragm capsule 224 is made to approximate the ratio of the stiffness of the diaphragm capsule 228 to the mass of the connector arm 126, magnetic core 124, connector arm extension 130, and an approximate percentage of the mass of the diaphragm capsule 228. The appropriate percentage of the mass of the capsules represents the effective mass thereof moved by a change in pressure differential. The degree to which inertial effects are cancelled out by the two opposing systems is then a function of the degree of closeness of approximation of the ratios.

In addition to the advantages heretofore described, the use of two output signal generating means, such as linear variable differential transformers of the embodiments of FIGS. 3, 5, 6, 7 and 8, provide certain additional advantages. The transformers, variable resistors, strain gauges, or the like, are matched in electrical and linear motion characteristics so that, when the two sensing systems which make up the transducer as shown in these embodiments are built identically and combined, they will have identical non-linearity characteristics, which tend to cancel one another out so as to provide an overall output that is extremely linear.

The pressure sensitivity for a given transducer is doubled by utilizing the two sensors and output signal generating means according to these embodiments. For example, for a structure which would normally have a sensitivity of two psi, as an overall range, the sensitivity by utilizing the pair of linear variable differential transformers and diaphragms in opposition is increased to one psi. In addition, the resonant frequency of the transducer is raised by a factor of 1.4.

From the foregoing, it will be seen that the utilization of the pair of opposed diaphragms results in increased sensitivity of the transducer and increased resonant frequency. In order to further increase resonant frequency and increase sensitivity, for a given diaphragm capsule construction, pairs of opposed diaphragm capsules may be disposed in parallel, with their output circuitry connected in series. Thus, in FIG. 10, there is shown schematically in section a pressure transducer 260 which combines, in a housing 262, a pair of pressure transducers of the type illustrated in FIG. 3, as providing absolute pressure measurement. The only change in the device of FIG. 10, with respect to the device shown in FIG. 3, is the housing. Therefore, like numbers are utilized in FIGS. 10 and 3 to illustrate like components. The operation of the device of FIG. 3 having been explained, the operation of the device of FIG. 10 will be apparent. Pressure enters through an inlet port 264 into the inlet chamber 266. The inlet chamber includes two diaphragm capsules 116 and two diaphragm capsules 128. The pressure is applied to these diaphragm capsules so as to form a pressure differential across the interfaces. Movement of the diaphragms in response to this pressure differential is applied to the magnetic cores, and so changes the output signals in the linear variable differential transformers.

Figure 10:
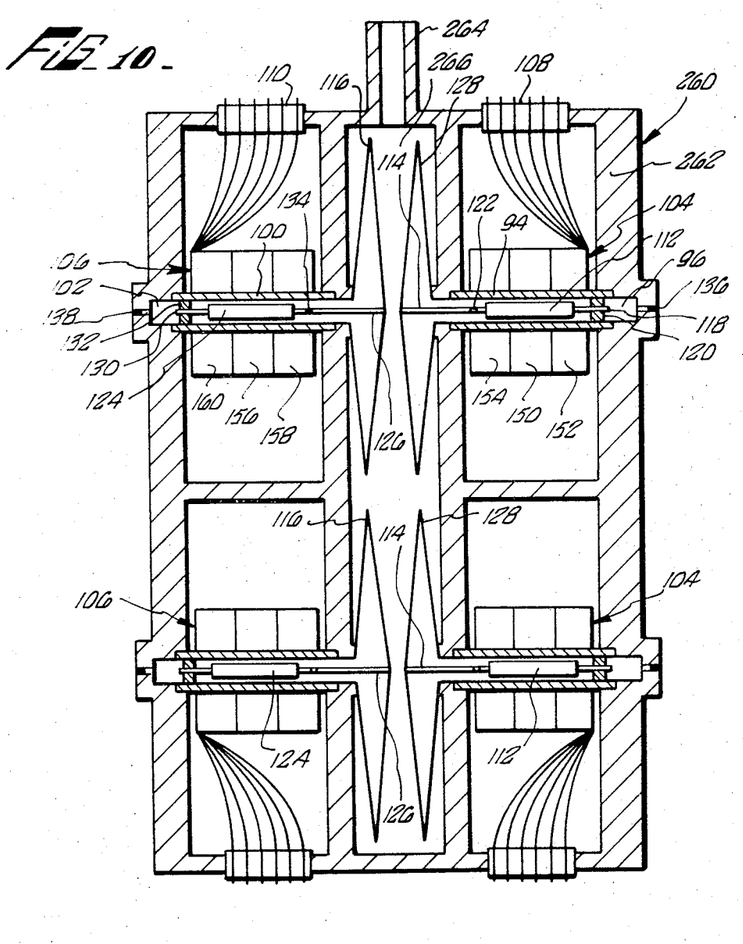
FIG. 10 is a schematic view, in section, of a pressure transducer which utilizes a pair of transducers as shown in FIG. 3.
Figure 11:
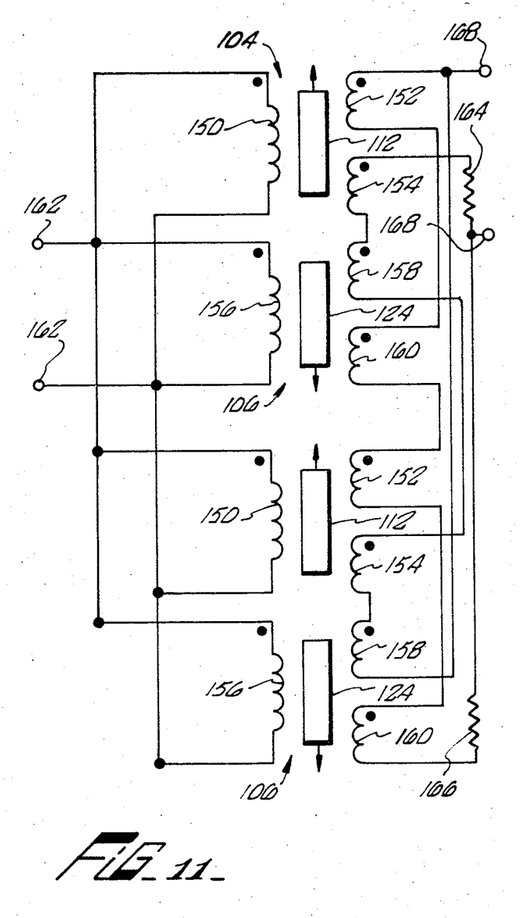
FIG. 11 is a schematic diagram of an output circuit suitable for use with the transducer of FIG. 10.

FIG. 11 illustrates the interconnection of the linear variable differential transformers of FIG. 10. Again in FIG. 11, inasmuch as the components are identical to those of FIG. 4, like members are utilized. As will be apparent from FIG. 11, the output windings 152 are serially connected to the output windings 160 and to each other. The output windings 154 and 158 are similarly connected. Thus, the a-c bridge circuit consisting of the output windings and the bridge resistors 164, 166 will, for a given change in pressure differential across the interfaces, produce twice the output change as does the circuit of FIG. 4. If even greater sensitivity or a still higher resonant frequency is to be provided, additional pairs of diaphragm capsules can be included in the device of FIG. 10 in the same manner as the two pairs of diaphragm capsules are combined therein. The output circuitry can similarly be connected as the output circuitry in FIG. 11, so as to provide for the increased sensitivity. Alternatively, output circuitry such as is described with respect to FIG. 9 can be used, rather than the use of the linear variable differential transformer.

As was mentioned heretofore, the disposition of pressure sensors in opposition provides for the elimination of inertial effects. For systems in which inertial effects are not of importance, or are not of significance by reason of diaphragm stiffness, the pressure sensors need not be mounted in opposition. The use of multiple sensors in such systems provides for the increased sensitivity and resonant frequency heretofore described. Obviously, appropriate changes in output circuit connections are required in such an embodiment to generate the required output signals.

The invention claimed is:

1. In a pressure transducer, the combination of:
a housing having first and second pressure inlet means;
a passageway communicating between said inlet means;
first diaphragm means disposed in said housing and forming a seal about said passageway so that the exterior of the first diaphragm means is in communication with the first pressure inlet means and the interior of the diaphragm means is in communication with the passageway so as to form a pressure interface therebetween;
second diaphragm means disposed in said housing and forming a seal about said passageway so that the exterior of the second diaphragm means is in communication with the second pressure inlet means and the interior of the diaphragm means is in communication with the passageway so as to form a pressure interface therebetween;
in which the diaphragm means include nestable diaphragms, the first pressure inlet means is adapted to normally receive a pressure greater than the pressure the second pressure inlet means receives, and the first diaphragm means has less surface area and greater rigidity than the second diaphragm means;
a substantially incompressible fluid filling the first diaphragm means and the second diaphragm means and the passageway communicating therebetween;
output signal means connected to one of said first and second diaphragm means for varying an output signal as a function of the pressure differential across said diaphragm means interface;
a second passageway communicating between said first and second pressure inlet means;
third diaphragm means disposed in said housing and forming a seal about said second passageway so that the exterior of the third diaphragm means is in communication with the first pressure inlet means and the interior of the third diaphragm means is in communication with the second passageway so as to form a pressure interface therebetween;
fourth diaphragm means disposed in said housing and forming a seal about said second passageway so that the exterior of the fourth diaphragm means is in communication with the second pressure inlet means and the interior of the fourth diaphragm means is in communication with the second passageway so as to form a pressure interface therebetween;
a substantially incompressible fluid filling the third diaphragm means and the fourth diaphragm means and the passageway communicating therebetween;
second output signal means connected to one of said third and fourth diaphragm means for varying a second output signal as a function of the pressure differential at said one diaphragm means interface;
said one of the first and second diaphragm means and said one of the third and fourth diaphragm means being connected to said housing so that said diaphragms move in opposite directions in response to a given change in pressure differential across said interfaces and move in the same direction in response to inertial effects; and
output means interconnecting the output signal means and the second output signal means for generating an output which changes upon a change in diaphragm positions due to a change in pressure differential between the pressure inlet means and does not change upon a change in diaphragm positions due to inertial effects.

2. In a pressure transducer, the combination of:
a housing having first pressure inlet means and first and second passageways in communication with said first pressure inlet means;
first diaphragm means disposed in said housing and forming a seal about said first passageway so that the exterior of the first diaphragm means is in communication with the first pressure inlet means the interior of the first diaphragm means is in communication with the first passageway so as to form a pressure interface therebetween;
second diaphragm means disposed in said housing and forming a seal about said second passageway so that the exterior of the second diaphragm means is in communication with the first pressure inlet means the interior of the second diaphragm means is in communication with the second passageway so as to form a pressure interface therebetween;
second pressure inlet means for communicating a second pressure to said passageways for application to the interior of said first and second diaphragm means;
third diaphragm means disposed in said housing and forming a seal about said first passageway so that the exterior of the third diaphragm means is in communication with the second pressure inlet means and the interior of the third diaphragm means is in communication with the first passageway so as to form a pressure interface therebetween;
fourth diaphragm means disposed in said housing and forming a seal about said second passageway so that the exterior of the fourth diaphragm means is in communication with the second pressure inlet means and the interior of the fourth diaphragm means is in communication with the second passageway so as to form a pressure interface therebetween;
a substantially incompressible fluid filling the diaphragm means and the passageways communicating therebetween;
first output signal means connected to the first diaphragm means for varying a first output signal as a function of the pressure differential at said first diaphragm means interface;
second output signal means connected to the second diaphragm means for varying a second output signal as a function of the pressure differential at said second diaphragm means interface; and
output means interconnecting the first and second output signal means for generating an output which changes upon a change in diaphragm positions due to a change in pressure differential between the pressure inlet means.

3. In a pressure transducer, the combination of:
a housing having first pressure inlet means and first and second passageways aligned with respect to a given axis and in communication with said first pressure inlet means;

first diaphragm means disposed in said housing and forming a seal about said first passageway so that the exterior of the first diaphragm means is in communication with the first pressure inlet means and the interior of the first diaphragm means is in communication with the first passageway so as to form a first interface therebetween;

second diaphragm means disposed in said housing and forming a seal about said second passageway so that the exterior of the second diaphragm means is in communication with the first pressure inlet means and the interior of the second diaphragm means is in communication with the second passageway so as to form a second interface therebetween, said first and second diaphragms being disposed in opposing relationship;

means for communicating a second pressure to said passageways for application to the interiors of said first and second diaphragm means; and an output circuit including a bridge having two active legs and means connected between the interfaces and the active legs for varying the output signal therein, so that the bridge output changes upon movement of the interfaces in opposite directions in response to a change in the pressure differential across the interfaces and remains unchanged upon movement of the interfaces in the same direction in response to inertial effects.

4. The combination of claim 1, and in which the two passageways are aligned so as to extend in opposite directions from one another, whereby one of the first and second diaphragm means and one of the third and fourth diaphragm means are disposed in opposing relationship, said one of the third and fourth diaphragm means, being so disposed, corresponding in surface area and rigidity to the one of the first and second diaphragm means so disposed, and the remaining diaphragm means corresponding in surface area and rigidity to each other.

5. The combination of claim 4, and in which the output signal means each include a linear variable differential transformer with a primary winding, a pair of secondary windings and a movable magnetic core within said windings and each output signal means is connected to its respective core for positioning the core relative to its respective secondary windings so that the coupling between the primary windings and the secondary windings are functions of the pressure differential across said interfaces.

6. The combination of claim 3, and in which the second pressure inlet means includes an evacuated chamber in communication with each of said passageways, and said passageways are aligned so as to extend in opposite directions from one another and the first and second diaphragm means are disposed in opposing relationship, whereby no output change occurs upon a change in diaphragm positions due to inertial effects.

7. The combination of claim 3, and in which the second pressure inlet means includes means for communicating ambient pressure to said passageways, and in which said passageways are aligned so as to extend in opposite directions from one another and the first and second diaphragm means are disposed in opposing relationship.

8. The combination of claim 2, and in which the ratio of the stiffness of the first diaphragm means to the moving mass associated therewith is the same as the ratio of the stiffness of the second diaphragm means to the moving mass associated therewith.

9. The combination of claim 8, and in which the diaphragm means include nestable diaphragms, the first pressure inlet means is adapted to normally receive a pressure greater than the pressure the second pressure inlet receives, and in which the diaphragm means forming the seals between the first pressure inlet means and the passageways have less surface area and greater rigidity than the other diaphragm means.

10. The combination of claim 9, and in which the output signal means each include a linear variable differential transformer with a primary winding, a pair of secondary windings and a movable magnetic core within said windings and each output signal means is connected to its respective core for positioning the core relative to its respective secondary windings so that the coupling between the primary windings and the secondary windings are functions of the pressure differential across said interfaces.

11. In a pressure transducer, the combination of:
a housing having first pressure inlet means and a plurality of first and second passageways in communication with said first pressure inlet means;

a plurality of first diaphragm means disposed in said housing and forming seals about said first passageways so that the exteriors of the first diaphragm means are in communication with the first pressure inlet means and the interiors of the first diaphragm means are in communication with the first passageways so as to form pressure interfaces therebetween;

a plurality of second diaphragm means disposed in said housing and forming seals about said second passageways so that the exteriors of the second diaphragm means are in communication with the first pressure inlet means and the interiors of the second diaphragm means are in communication with the second passageways so as to form pressure interfaces therebetween;

second pressure inlet means for communicating a second pressure to said passageways for application to the interiors of said first and second diaphragm means;

first output signal means connected to the first diaphragm means for varying a first output signal as a function of the pressure differential at said first diaphragm means interfaces;

second output signal means connected to the second diaphragm means for varying a second output signal as a function of the pressure differential at said second diaphragm means interfaces; and output means interconnecting the first and second output signal means for generating an output which changes upon a change in diaphragm positions due to a change in pressure differential between the pressure inlet means.

12. The combination of claim 11, and in which the second pressure inlet means includes an evacuated chamber in communication with each of said passageways, and said passageways are aligned so as to extend in opposite directions from one another and the first and second diaphragm means are disposed in opposing relationship, whereby no output change occurs upon a change in diaphragm positions due to inertial effects.

13. The combination of claim 12, and including a plurality of third diaphragm means disposed in said housing and forming a seal about said first passageway so that the exterior of the third diaphragm means is in communication with the second pressure inlet means and the interior of the third diaphragm means is in communication with the first passageway so as to form a fluid interface therebetween;

a plurality of fourth diaphragm means disposed in said housing and forming a seal about said second passageway so that the exterior of the fourth diaphragm means is in communication with the second pressure inlet means and the interior of the fourth diaphragm means is in communication with the second passageway so as to form a fluid interface therebetween; and a substantially incompressible fluid filling the diaphragm means and the passageways communicating therebetween.

14. The combination of claim 3, and in which the output circuit includes a pair of linear variable differential transformers, one having a core connected to one of the interfaces and the other having a core connected to the other interface and each having a first and a second output winding; and means serially connecting the first output winding of each of the transformers with the second output winding of the other to form the active legs of the bridge.

* * * * *

UNITED STATES PATENT OFFICE
CERTIFICATE OF CORRECTION

Patent No. 3,747,042  Dated July 17, 1973

Inventor(s) JAMES B. SHELDON

It is certified that error appears in the above-identified patent and that said Letters Patent are hereby corrected as shown below:

Column 1, line 30, "the the of providing" should be amended to -- the deficiency of providing --; line 53, "there within the fluid" should be amended to -- there within, the fluid --. Column 2, line 11, "In a change in output signal" should be amended to -- In the --. Column 3, line 3, "Dspssed" should be amended to -- Disposed --; line 48, "input" should be amended to -- output --. Column 4, line 7, "it" should be amended to -- its --. Column 6, line 66, "conductor" should be amended to -- connector --. Column 8, line 10, "alternative" should be amended to -- alternate --; line 22, "such as utilized" should be amended to -- such as is utilized --.

Signed and sealed this 17th day of September 1974.

(SEAL)
Attest:

McCOY M. GIBSON JR.
Attesting Officer

C. MARSHALL DANN
Commissioner of Patents